(12) United States Patent
Newman et al.

(10) Patent No.: US 7,756,182 B2
(45) Date of Patent: Jul. 13, 2010

(54) RF EXCITED $CO_2$ SLAB LASER TUBE HOUSING AND ELECTRODES COOLING

(75) Inventors: Leon A. Newman, Glastonbury, CT (US); Christian J. Shackleton, Granby, CT (US); Adrian Papanide, Sheldon, CT (US)

(73) Assignee: Coherent, Inc., Santa Clara, CA (US)

( * ) Notice: Subject to any disclaimer, the term of this patent is extended or adjusted under 35 U.S.C. 154(b) by 188 days.

(21) Appl. No.: 12/079,296

(22) Filed: Mar. 26, 2008

(65) Prior Publication Data

US 2008/0240183 A1 Oct. 2, 2008

Related U.S. Application Data

(60) Provisional application No. 60/920,680, filed on Mar. 28, 2007.

(51) Int. Cl.
*H01S 3/22* (2006.01)
(52) U.S. Cl. .............................. 372/55; 372/34; 372/35; 372/60
(58) Field of Classification Search ................... 372/55, 372/34, 35
See application file for complete search history.

(56) References Cited

U.S. PATENT DOCUMENTS

| | | | | |
|---|---|---|---|---|
| 4,238,741 A | * | 12/1980 | Kasner et al. | 372/4 |
| 4,446,344 A | | 5/1984 | Fiedler | 200/83 B |
| 5,123,028 A | | 6/1992 | Hobart et al. | 372/95 |
| 5,127,017 A | | 6/1992 | Krueger et al. | 372/61 |
| 5,216,689 A | | 6/1993 | Gardner et al. | 372/87 |
| 5,278,859 A | | 1/1994 | Arndt | 372/64 |
| 5,335,242 A | | 8/1994 | Hobart et al. | 372/95 |
| 5,412,681 A | * | 5/1995 | Eisel et al. | 372/64 |
| 5,434,881 A | | 7/1995 | Welsch et al. | 372/87 |
| 5,479,428 A | | 12/1995 | Kuzumoto et al. | 372/61 |
| 5,502,740 A | | 3/1996 | Welsch et al. | 372/82 |

(Continued)

FOREIGN PATENT DOCUMENTS

GB              985410          3/1965

(Continued)

*Primary Examiner*—Dung T Nguyen
(74) *Attorney, Agent, or Firm*—Morrison & Foerster LLP

(57) ABSTRACT

The laser tube housing of a $CO_2$ slab laser is provided with a cooling system in which coolant fluid tubes are inserted into hollowed out portions formed in the longitudinal sidewalls of the laser tube housing; mounting the coolant fluid tubes in this way provides for enhanced cooling and increased stiffness of the laser tube housing. Also, a cooling system is provided for the laser's electrode assembly that relies on a manifold system that is mounted on a longitudinal sidewall of the laser tube housing to route coolant fluid through the sidewall to the electrode assembly; sidewall flow of the coolant fluid enables the end flanges of the laser tube housing to be remove without disturbing either the electrodes or the optical resonator of the laser. Also, a bracket assembly is provided for attaching the laser's electrode assembly to a longitudinal sidewall of the laser tube housing; the bracket assembly includes two brackets each of which is attached to a respective end of the electrode assembly and each of which is also attached to a longitudinal sidewall of the laser tube housing in proximity to a respective longitudinal end of the laser tube housing.

13 Claims, 9 Drawing Sheets

U.S. PATENT DOCUMENTS

| | | | |
|---|---|---|---|
| 5,600,668 A | 2/1997 | Erichsen et al. | 372/87 |
| 6,198,758 B1 | 3/2001 | Broderick et al. | 372/36 |
| 6,983,001 B2 | 1/2006 | Sukhman et al. | 372/34 |
| 7,126,973 B2 | 10/2006 | Xin et al. | 372/64 |
| 7,260,134 B2 | 8/2007 | Shackleton et al. | 372/87 |
| 7,263,116 B2 | 8/2007 | Shackleton et al. | 372/64 |
| 7,274,722 B2 | 9/2007 | Taufenbach | 372/61 |
| 2005/0175054 A1 | 8/2005 | Shackleton et al. | 372/55 |
| 2005/0175147 A1 | 8/2005 | Brauss | 378/81 |

FOREIGN PATENT DOCUMENTS

| | | |
|---|---|---|
| JP | 8-14114 | 1/1996 |

\* cited by examiner

RF EXCITED CO₂ SLAB LASER TUBE HOUSING AND ELECTRODES COOLING

PRIORITY CLAIM

This application claims priority from U.S. Provisional Application No. 60/920,680, filed Mar. 28, 2007, and titled "RF Excited $CO_2$ Slab Laser Tube Housing and Electrode Cooling." Provisional Application No. 60/920,680 is hereby incorporated by reference herein in its entirety.

FIELD OF THE INVENTION

The present invention relates generally to carbon dioxide ($CO_2$) slab lasers and, in particular, to structures for cooling the laser tube housing and electrodes of a $CO_2$ slab laser.

BACKGROUND OF THE INVENTION

The discharge of a RF excited $CO_2$ slab laser is typically diffusion cooled. In diffusion cooled $CO_2$ slab lasers, the excited (i.e., hot) $CO_2$ molecules collide with the surfaces of the metal electrodes and become de-excited (i.e., cooled) by the collision and the transition to the ground state. In slab lasers, diffusion cooling is facilitated by providing a small separation (i.e., gap) between the parallel facing electrodes and by having the electrodes liquid cooled. The small gap ensures good heat transfer (i.e., a large number of collisions) and, therefore, cooling from the gas discharge to the metal electrodes. The liquid cooling flow in contact with the electrodes conducts heat away from the electrodes. The optimum gap dimension is determined by the gas pressure, RF excitation frequency, gas composition, etc. Keeping the discharge cooled is important because the output power of a $CO_2$ laser is inversely proportional to the temperature of the discharge. The cooler the discharge, the higher the laser's efficiency.

The electrodes and the laser tube housing that contains the laser's electrodes, gas mixture and optical resonator are typically fabricated from Aluminum due to cost, good heat conduction and low weight. Since Aluminum corrodes in contact with water, a chemical stabilizer is usually added to the water to prevent corrosion within the Aluminum cooling passages. Copper is a preferred cooling material, but it cannot be used within the hermetically sealed laser tube housing because it oxidizes, thereby reducing the $O_2$ content of the laser gas mixture. As the $O_2$ content is depleted by the Copper, the laser power decreases. This problem is usually solved by plating the Copper surfaces exposed to the laser gas mixture within the laser tube housing with an inactive material such as Nickel.

In order to facilitate placing the electrode assembly into the long rectangular or round laser tube housing, which typically has narrow openings at each end, and to facilitate making the liquid cooling connections between the electrodes and a liquid coolant supply located outside the long laser tube housing, the electrodes are typically inserted at one end of the housing and then hermetically sealed within the housing with an Aluminum end flange using an O-ring. See U.S. Pat. No. 5,123,028, entitled "RF Excited $CO_2$ Slab Waveguide Laser", issued Jun. 16, 1992 (Ref. 1). Having the electrode coolant pass through one of the end flanges presents a serviceability problem because the mirror(s) of the laser's optical resonator are mounted on the end flanges, one of which is also holding one end of the electrode assembly in place. Consequently, inspection of the optical resonator's mirrors requires the disassembly of the coolant connections. The present invention addresses this serviceability problem by providing coolant connections to the electrodes through one of the sides and close to one end of the metal laser tube housing.

Even though most of the heat generated by the laser discharge is carried away by the coolant flowing through the electrodes, the gas contained within the hermetically sealed laser tube housing gradually heats up, thereby heating the laser tube housing. Since the mirrors of the optical resonator are typically mounted directly on the metal flanges, which are in turn directly mounted on the ends of the metal laser tube housing, the expansion and contraction and twisting and bending of the laser tube housing with changing temperature can negatively affect the laser's output performance (i.e., misalignment of the optical resonator can cause output power and beam pointing variations). The long temperature stabilization time of the laser tube housing compounds the variation problem when the laser is operated at different pulse repetition frequencies (PRFs). It becomes increasingly more difficult to ignore the effect that temperature variations within the laser tube housing have on the laser's output power as the output power increases.

In the prior art, the effects of the slow temperature drift on the laser's optical resonator caused by heating of the laser tube housing was either ignored, as in above-cited Ref. 1, or addressed by placing the mirrors on stiff Invar rods. Invar is well known to have a very low temperature coefficient of expansion and it has often been used to construct stable optical resonators. See U.S. Pat. No. 5,502,740, entitled "Stripline Laser Resonator", issued on Mar. 26, 1996 (Ref. 2) and U.S. Pat. No. 5,278,859, entitled "Stripline Laser", issued on Jan. 11, 1994 (Ref. 3). The Invar rod approach has its drawbacks because of the cost of the Invar and the fact that the heavy weight of the Invar appreciably increases the weight of the laser tube housing.

Another prior art approach is to flow the coolant across the flat surfaces, or through holes placed within the walls, of the metal laser tube housing. See U.S. Pat. No. 5,127,017, entitled "Electrical Excited Stripline Laser", issued on Jun. 30, 1992 (Ref. 4); U.S. Pat. No. 7,260,134, entitled "Dielectric Coupled $CO_2$ Slab Laser" issued on Aug. 21, 2007 (Ref. 5); and U.S. Pat. No. 7,263,116, entitled "Dielectric Coupled $CO_2$ Slab Laser", issued on Aug. 28, 2007 (Ref. 6).

In order to obtain sufficient cooling in accordance with the teachings of Refs. 4-6, the coolant needs to flow within holes placed within the thickness of the flat or tubular surfaces of the laser tube housing walls, as discussed in Refs. 4-6. This approach requires that the walls of the laser tube housing to be thicker in order to compensate for the loss of stiffness in the structure. The stiffness is required to minimize the pressure effects of the atmosphere deforming the partially evacuated laser tube housing (i.e., which contains a typical pressure between 50 Torr to 150 Torr) and, therefore, affecting the optical resonator alignment. This approach is not attractive because of increased weight and cost.

The present invention provides a superior approach to addressing this issue of laser tube housing cooling and stiffness.

SUMMARY OF THE INVENTION

One aspect of the present invention provides a cooling system for the laser tube housing of a $CO_2$ slab laser. Rather than providing cooling at the exterior face of the laser tube housing, this aspect of the present invention utilizes cooling tubes that are inserted into hollowed out portions that are formed in the longitudinal sidewalls of the laser tube housing.

A second aspect of the present invention provides a cooling system for the electrode assembly that is contained within the laser tube housing of a $CO_2$ slab laser. This aspect of the present invention relies on a coolant fluid manifold system that is mounted on a longitudinal sidewall of the laser tube housing to route coolant fluid through the electrode assembly. The sidewall mounting of the electrode coolant fluid manifold system enables the end flanges of the laser tube housing to be removed without disturbing the alignment of either the electrodes or the optical resonator of the laser.

A third aspect of the present invention provides a bracket assembly for attaching the electrode assembly of a $CO_2$ slab laser to a longitudinal sidewall of the laser tube housing. The bracket assembly includes two brackets each of which is attached to a respective end of the electrode assembly and each of which is also attached to a longitudinal sidewall of the laser tube housing in proximity to a respective longitudinal end of the laser tube housing.

The features and advantages of the various aspects of the present invention will be more fully understood and appreciated upon consideration of the following detailed description of the invention and the accompanying drawings, which set forth illustrative embodiments in which the concepts of the invention are utilized.

DETAILED DESCRIPTION OF THE INVENTION

Figure 1:
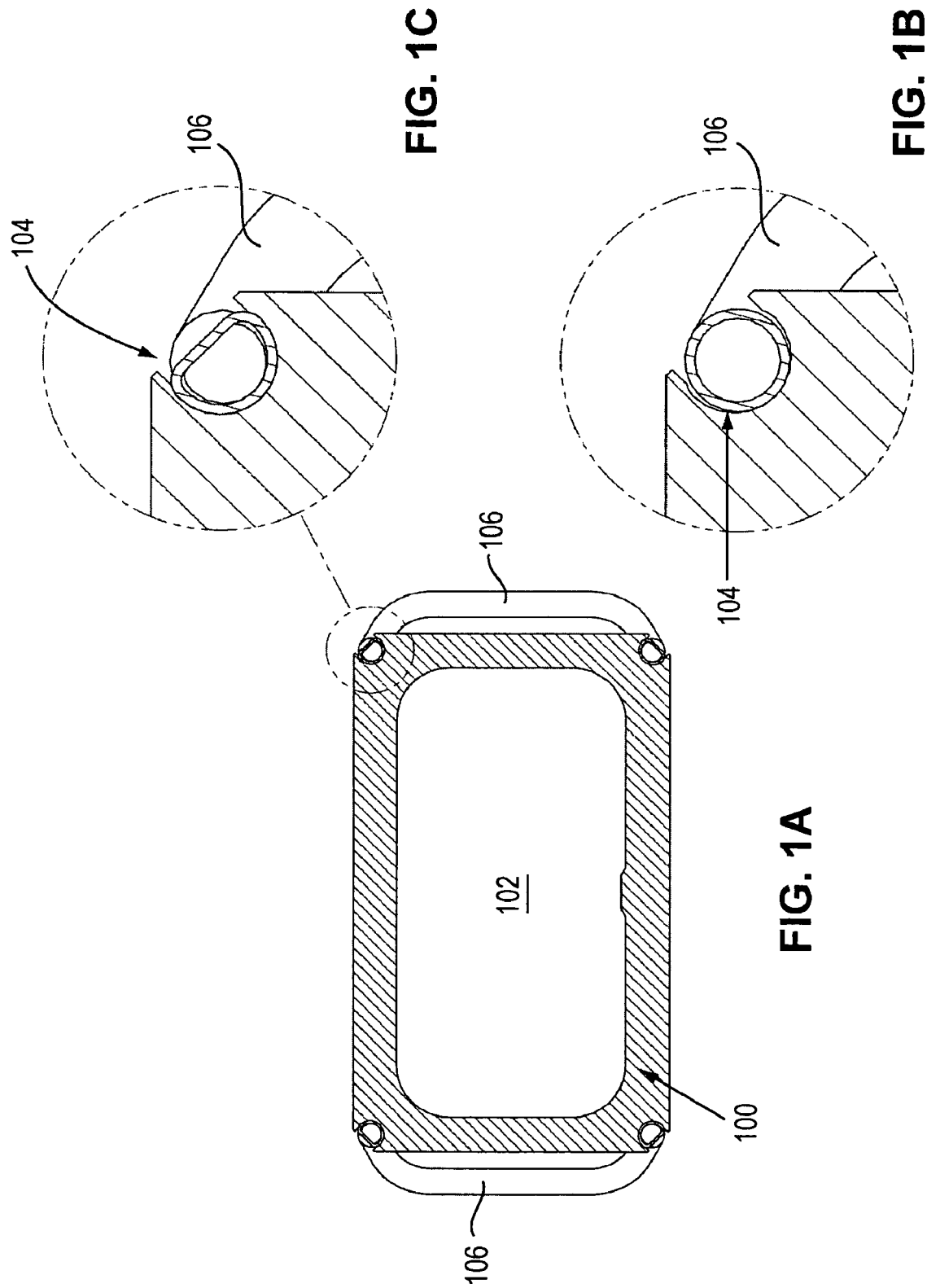
FIG. 1A is a cross section drawing illustrating a rectangular laser tube housing.
FIG. 1B is a partial cross section drawing illustrating the hollowed out corners of the FIG. 1A laser tube housing.
FIG. 1C is a partial cross section drawing illustrating the shape of copper tube inserted into the hollowed out corners of the FIG. 1A laser tube housing.

FIG. 1A shows a rectangular laser tube housing 100 for a 400 W output power, RF excited (i.e., typically at 100 MHz) $CO_2$ slab laser. The interior 102 of the rectangular housing 100 will contain a typical $CO_2$ mixture at a pressure of approximately 100 Torr, as well as the optical resonator and the electrode assembly, all in the well known manner. FIG. 1B shows one of the four hollowed out corners 104 of the rectangular housing structure 100 into which a properly sized copper cooling tube 106 is inserted in accordance with the concepts of the present invention. Since the edges of the rectangular laser tube housing 100 have more material then the flat surfaces, hollowing out the corners does not appreciably reduce the stiffness of the structure in comparison with the resulting stiffness if the hollowed out openings were placed on the flat surfaces of the structure, or if cooling passages were drilled within the flat surfaces of the laser tube housing, as in the prior art. FIG. 1C shows the shape of the copper cooling tube 106 inserted in the hollowed out corners 104 after the copper cooling tube 106 has been press fitted into the hollowed out opening. The press fitted process insures tight contact between the laser tube housing 100 and the copper cooling tube 106 for good heat transfer. The use of Copper tubing instead of Aluminum tubing allows the use of water as a coolant without requiring the addition of a corrosion inhibitor.

Those skilled in the art will appreciate that, although the use of the above-described cooling concepts with a long rectangular laser tube housing has its advantages, the concepts of this aspect of the present invention are also applicable to other laser tube housing shapes, e.g. a cylindrical laser tube housing.

Figure 2:
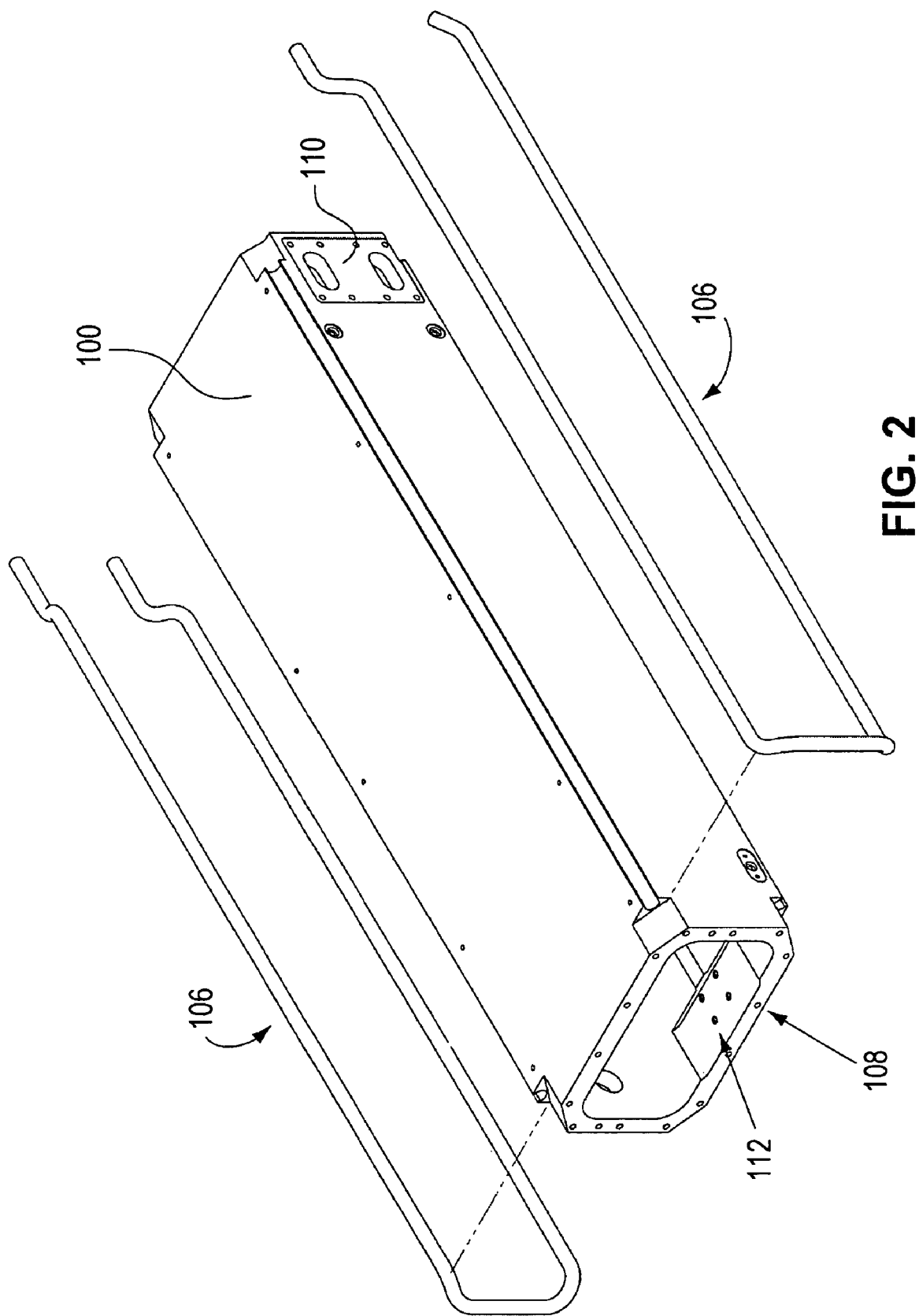
FIG. 2 is an exploded view illustrating the insertion of two copper cooling tubes within the four hollowed out edges of the FIG. 1A laser tube housing.

FIG. 2 illustrates an exploded view of the two elongated copper cooling tubes 106 and where the cooling tubes 106 are inserted within the four hollowed out edges of the laser tube housing 100, as shown in the FIG. 1 embodiment of the invention. Sixteen screw holes 108 are used in the illustrated embodiment to mount the end flanges (not shown) onto the ends of the rectangular laser tube housing 100. The large number of screws is used to ensure adequate and even pressure on the O-ring (not shown) of the end flanges to obtain a hermetic seal between the end flange and the laser tube housing 100. FIG. 2 also shows an access area 110 that contains the openings for the electrode cooling connections at the right hand end of the laser tube housing 100 shown in FIG. 2. The eight screw holes for mounting the coolant transfer manifold, described in greater detail below, that contains the coolant connectors to the laser tube housing are also shown. Again, the large number of screws is used to ensure sufficient and even pressure on the O-ring on the coolant mounting plate (not shown) located between the mounting plate and the laser tube housing to obtain a good hermetical seal. A machined area 112 for an electrode support bracket, also described in greater detail below, is also shown in FIG. 2.

Figure 3:
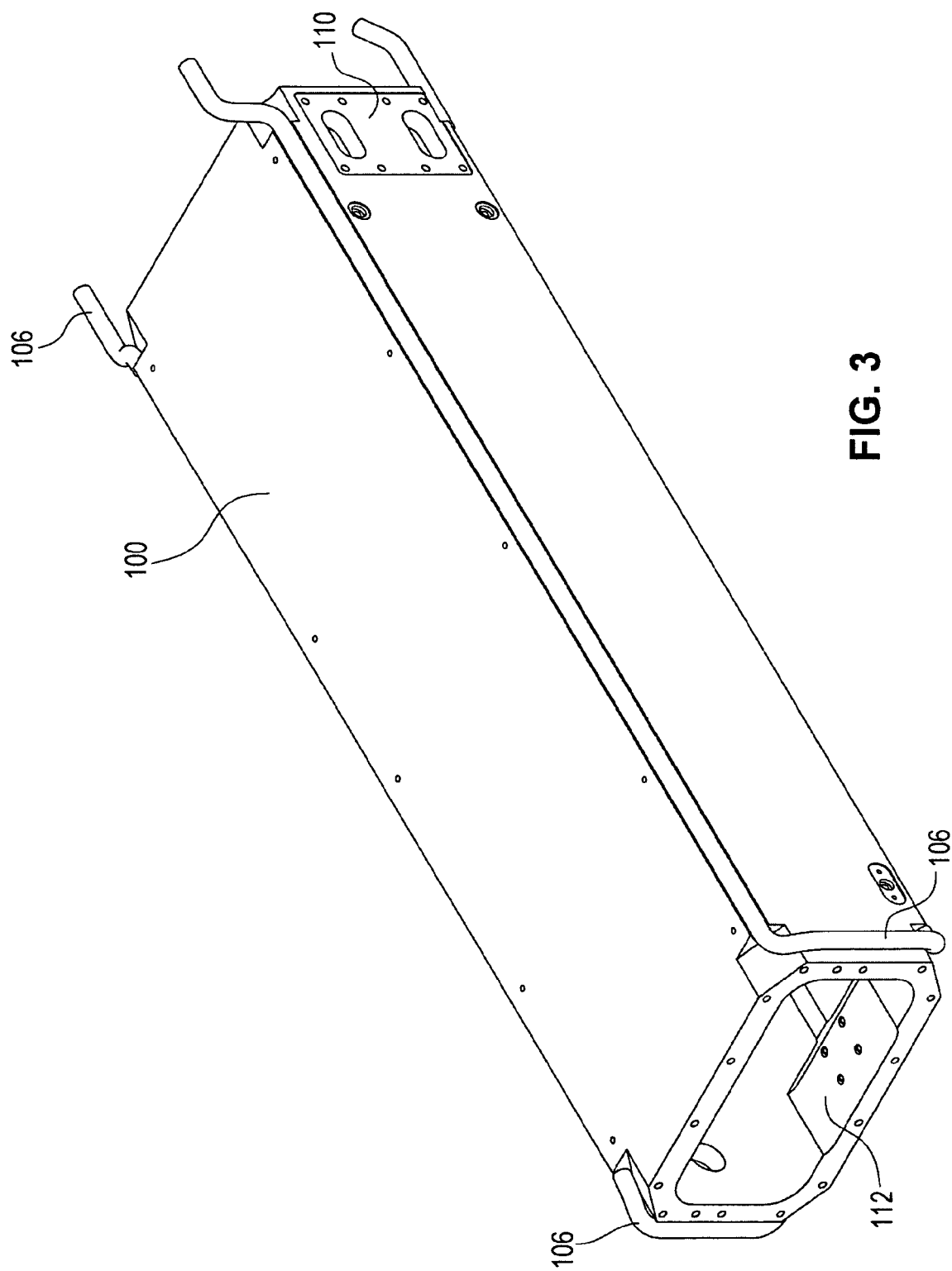
FIG. 3 is an isometric view illustrating the laser tube housing of FIG. 2 with the copper cooling tubes installed.

FIG. 3 provides an isometric view showing the elongated copper cooling tubes 106 installed in the longitudinal hollowed out portions or channels 104 of the laser tube housing 100. The coolant flows in parallel in the two tubes 106. The coolant first flows through these two tubes 106 before eventually being directed to electrode cooling tubes, as discussed in greater detail below.

Figure 4:
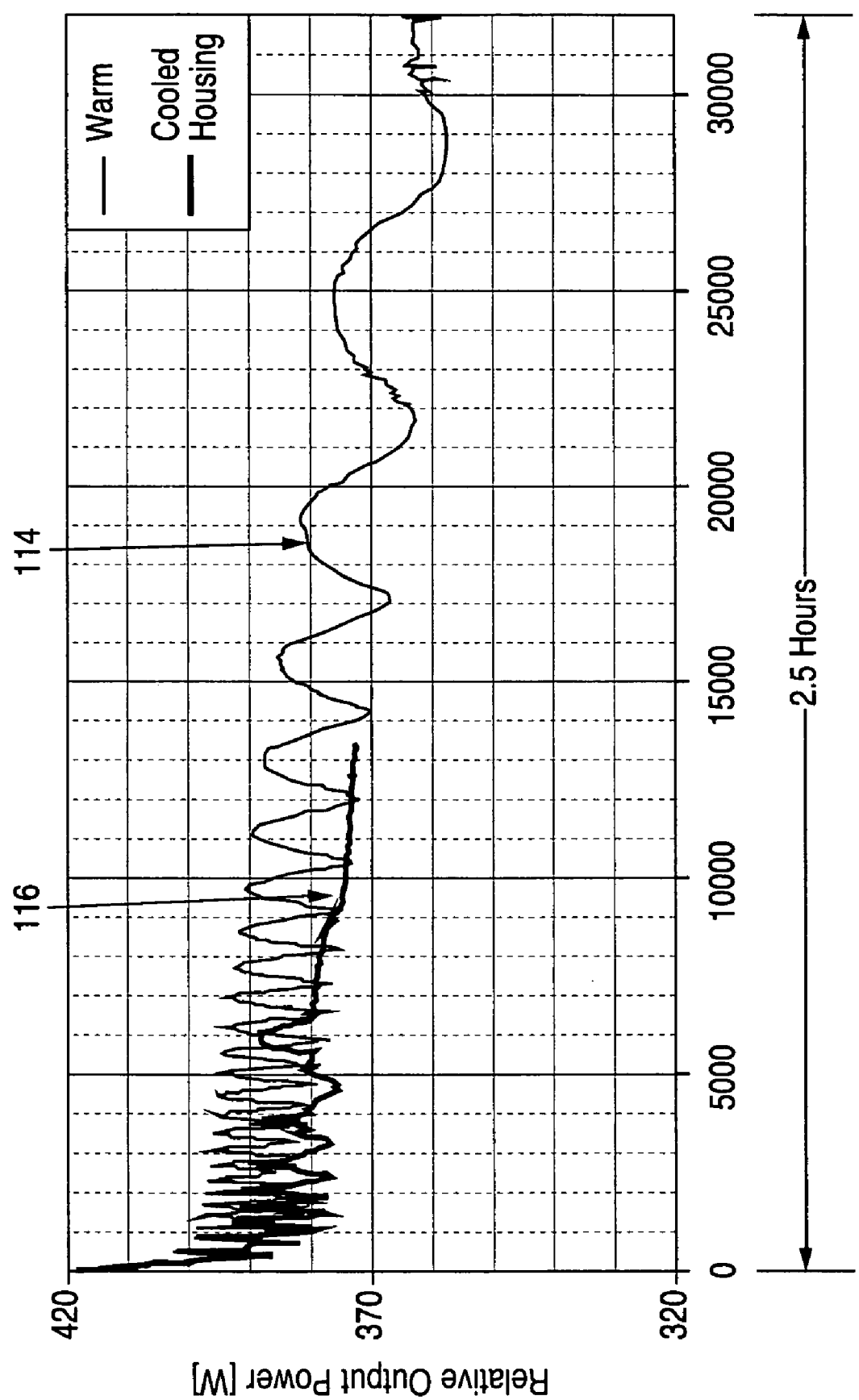
FIG. 4 is a graph showing laser relative output power over time, warm versus cooled housing.

FIG. 4 illustrates data taken over a 2.5 hour period showing that cooling the laser tube housing 100 provides a significant reduction in the time required to stabilize the laser resonator structure. The light curve 114 in FIG. 4 is the output power behavior without the laser tube housing 100 being cooled; the dark curve 116 in FIG. 4 is the power output as a function of time for the cooled laser tube housing. Both curves start with an output power of approximately 420 W. In the un-cooled case, the laser output is stabilized at approximately 360 W output at the end of approximately 2.5 hours. The cooled laser is stabilized in approximately one-half that time at a power output of approximately 370 W. The reduction in the time required for the laser tube housing 100 to reach temperature equilibrium increases the utilization time of the material processing systems in which the $CO_2$ laser is embedded.

Figure 5:
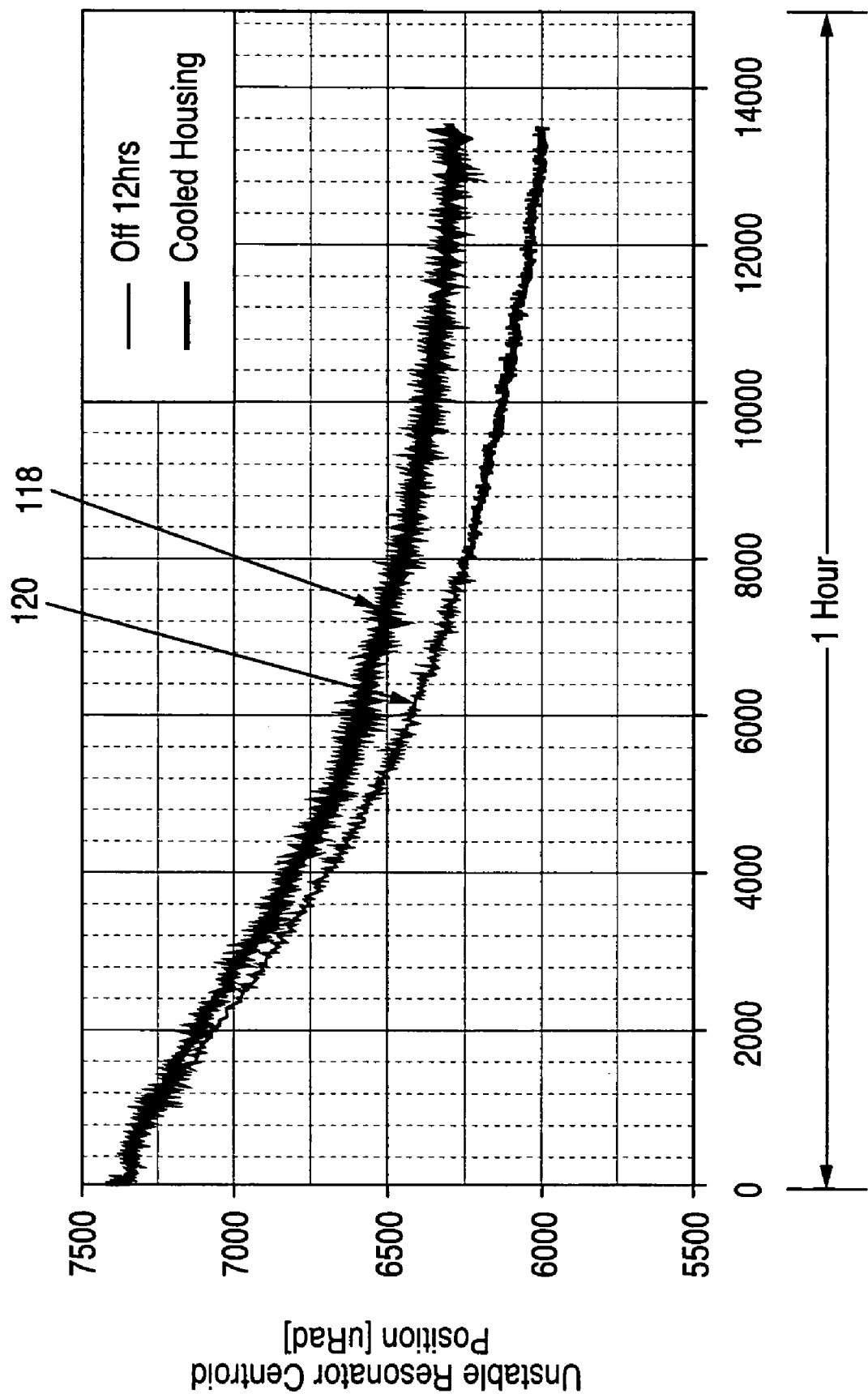
FIG. 5 is a graph showing laser unstable resonator centroid position versus time.

FIG. 5 illustrates data showing that the pointing stability of the laser beam is also improved by cooling the laser tube housing 100 as discussed above in conjunction with FIGS. 1-3. Data was taken of the laser's unstable resonator beam's centroid position as a function of laser operation time for both the cooled and un-cooled conditions. The dark curve 118 of FIG. 5 shows the changes in the beam's centroid over a one hour operation period with the laser tube housing 100 being cooled as per the teaching of FIGS. 1-3. The 500 W laser used in the experiments was operated continuously at a PRF of 1 kHz and at a duty cycle of 60%. Note that the centroid of the unstable resonator beam moved approximately 1,100 micro-radians from start-up to the end of the 1 hour time period. The laser was then turned off for 12 hours and the experiment repeated, but without cooling of the laser tube housing 100. Note that for the un-cooled condition, as shown by curve 120, the unstable resonator's beam moved approximately 1,350 micro-radians over the one hour period, i.e., an increase in beam movement of 250 micro-radians, or approximately 23% increased deflection over the cooled laser tube housing condition.

In summary, the cooling of the laser tube housing by flowing the coolant along the edges of the rectangular housing provides a number of advantages. Flowing the coolant in tubes inserted and pressed into longitudinal hollowed-out openings in the laser tube housing 100 does not appreciably reduce the stiffness of the housing structure in comparison with the prior art of placing such cooling tubes on the flat surfaces of the housing or within the housing material. Preserving the stiffness of the structure is important in order to prevent misalignment of the optical resonator with atmospheric pressure changes. This is especially true for pulsed $CO_2$ lasers operating at variable pulse repetition frequency (PRF) and variable duty cycles. One teaching of the prior art cooled only the electrodes and not the laser tube housing. This results in a long time for the laser performance to reach equilibrium because of the slow heating up of the laser tube housing. Under variable pulsed conditions, equilibrium is never reached. The resulting expansion, contraction, twisting, and bending of the laser tube housing yields variations in the laser's output power, mode quality and pointing stability. The teachings of this invention greatly reduce these undesirable laser performance effects. Some of the prior art used low thermal expansion Invar rods on which the laser mirrors are mounted so as to minimize the temperature variations of the laser housing when it was not cooled. This approach increases the cost, size, and weight of the laser when compared with the teachings of this invention. The increase in weight and size of the laser tube housing is a disadvantage especially when the laser is to be mounted on a robotic arm.

Figure 6:
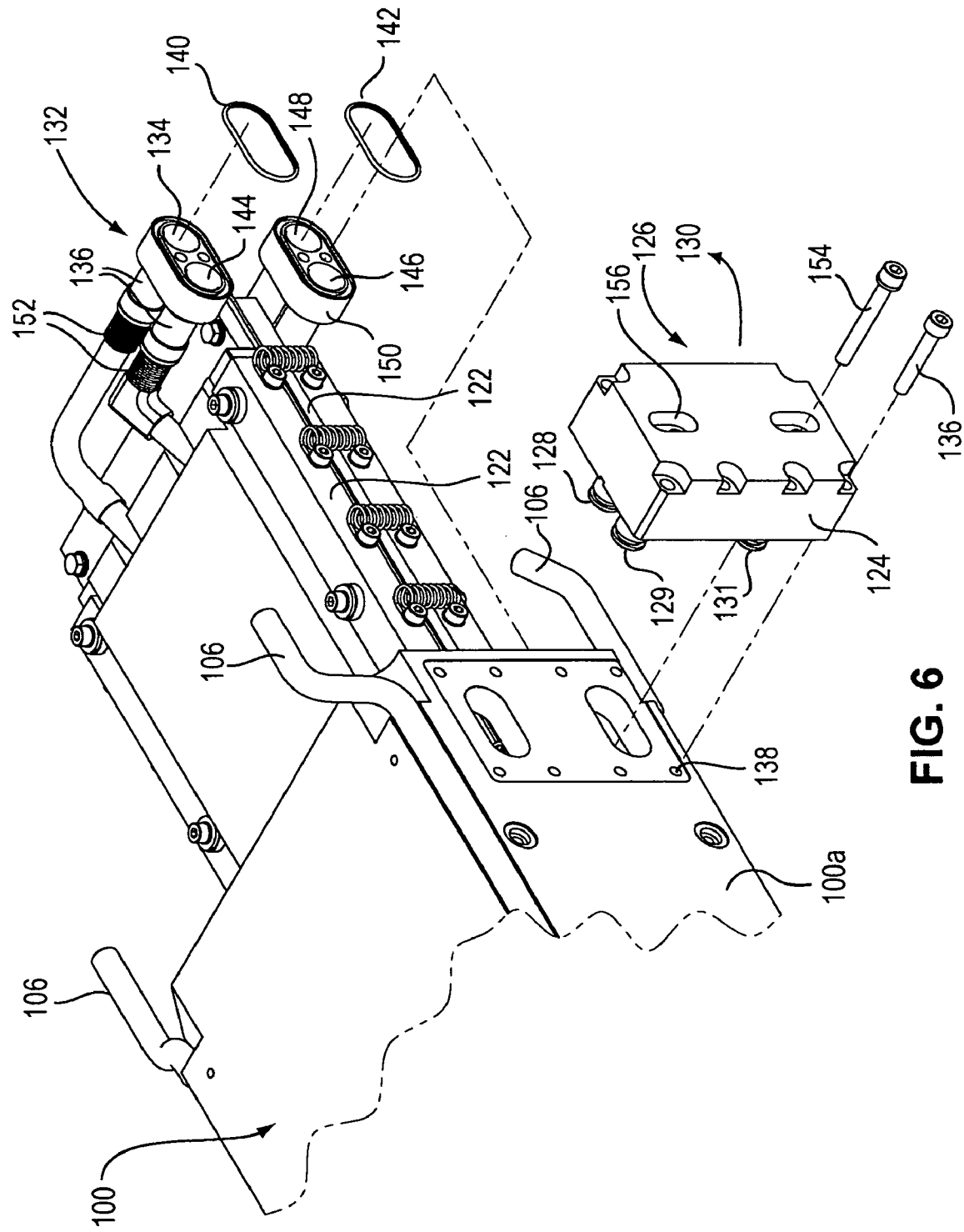
FIG. 6 is a partially exploded view illustrating the cooling of the electrodes of a $CO_2$ slab laser through one of the sidewalls of the laser tube housing.

FIG. 6 illustrates the basic features of the cooling of the $CO_2$ slab laser electrodes 122 through one of the sidewalls 100a of a laser tube housing 100 in accordance with the concepts of the present invention. A rectangular shaped laser tube housing 100 is shown as an example, but those skilled in the art will appreciate that the concepts of this aspect of the present invention also apply to a cylindrical or other shaped housing. The details of the electrode assembly are not part of this invention and are disclosed in Ref. 1 and Ref. 5.

As shown in the FIG. 6 embodiment of the invention, a 6-port liquid coolant transfer main manifold 124 is used to split the input coolant flow (not shown in FIG. 6 except for the arrow 126 indicating where it is located on main manifold 124) from a primary outside source into two outputs 128, one each to the two electrodes 122 (only one of the two outputs 128 is shown in FIG. 6 because the second output 128 that feeds the bottom electrode is hidden from view by the manifold 124). An arrow 130 in FIG. 6 illustrates where output coolant flow from the manifold 124 is located. Coolant from the main source input 126 flows through the main manifold 124, into a coolant transfer assembly that includes input coolant port 134, and out of the coolant transfer assembly 132 into a ceramic flow tube 136. Coolant flows is enabled to flow into input port 134 when the entire electrode assembly is slid to the left in FIG. 6, that is, into the laser tube housing 100, which aligns output port 128 of the main manifold 124 with input port 134 of transfer assembly 132. This coupling is held in place by the coolant transfer main manifold 124 being screwed onto the sidewall 100a of the laser tube housing 100 by the eight screws 136 (for simplicity, only one screw 136 is shown). The eight screws 136 are threaded into the eight screw holes 138 formed in the housing sidewall 100a. The coolant transfer manifold 124 has an O-ring (not shown in FIG. 6 because it is hidden from view) to maintain laser tube housing 100 hermetically sealed.

The electrode fluid transfer sub-manifold assemblies 132, 150 include the O-rings 140 and 142, respectively, coolant input port 134 and output port 144 for the hot electrode and, similarly, output port 146 and input port 148 for the ground (bottom) electrode 122 for electrode transfer sub-manifold 150. The O-rings 140, 142 are provided to prevent coolant leakage. The top two ports 134, 144 of the hot electrode's input/output transfer sub-manifold 132 that supplies coolant to the hot electrode 122 have a short sections of ceramic input/output coolant flow tubes 136 to prevent RF being conducted from the hot electrode 122 to the laser tube housing 100, which is at ground potential. The bottom two ports 148, 146 of the ground electrode input/output transfer sub-manifold 150 provide coolant to the ground electrode 122 and, therefore, do not require sections of ceramic dielectric flow tubes. Both assemblies 132, 150 also contain flexible bellows 152 to facilitate bending of the cooling flow tubes to align both of the two port sub-manifolds 132, 150 with the respective input and output ports of sub-manifolds 132, 150 and coolant transfer manifold 124. In this manner, the output ports 128 (including the one not shown below it in the coolant transfer main-manifold 124) are aligned with input ports 134 and 148 of the two port sub-manifolds 132 and 146, respectively, and output ports 144 and 146 are aligned with the input ports 129 and 131, respectively. Four screws 154 (only one is shown for simplicity) are used to hold the three transfer manifolds 124, 132 and 150 together. The screws are inserted through the two openings 156 and 158 in the six-port manifold 124 and threaded into the two holes provided in each of the two port sub-manifolds 132, 150 to hold them together and compress the O-rings to prevent liquid leakage.

In this manner, coolant flows through port 126, out of port 128, into port 134, cools the hot electrode 122, and then flows out of port 146, into port 129 and out of port 130. In a similar manner, coolant flows into port 126, out of the port 128 not shown in FIG. 6 because it is blocked from view by the coolant transfer manifold 124, into port 148, cools the ground electrode 122, and then flow out of port 146, into port 131 and out of port 130.

Figure 7A:
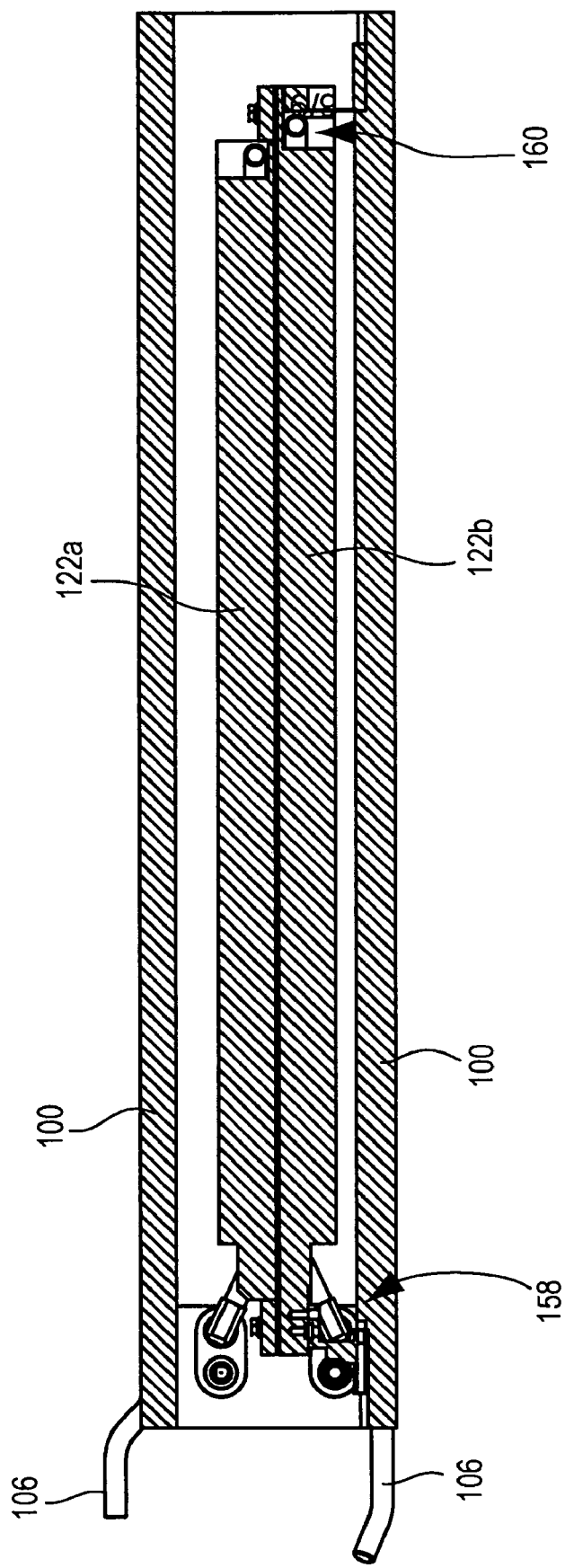
FIG. 7A is an axial section view taken through the electrodes of an assembled electrode assembly within a laser tube housing.

FIG. 7A illustrates an axial section view through the top, hot electrode 122a and the bottom, grounded electrode 122b of the assembled electrode assembly within the laser tube housing 100. The purpose of FIG. 7A is to illustrate one preferred approach for attaching both ends of the electrode assembly to the same side of the rectangular laser housing 100. As in FIG. 6, the end flanges are not shown because they are not a subject of this invention. The details of interest in FIG. 7A are the electrode support brackets 158, 160 located at respective interior ends of the laser tube housing 100. The purpose of these brackets 158, 160 is to attach the electrode assembly to the interior of the laser tube housing 100 and to maintain the discharge contained within the narrow gap between the electrodes 122a and 122b, aligned with the laser resonator's mirrors that are mounted on the end flanges.

Figure 7B:
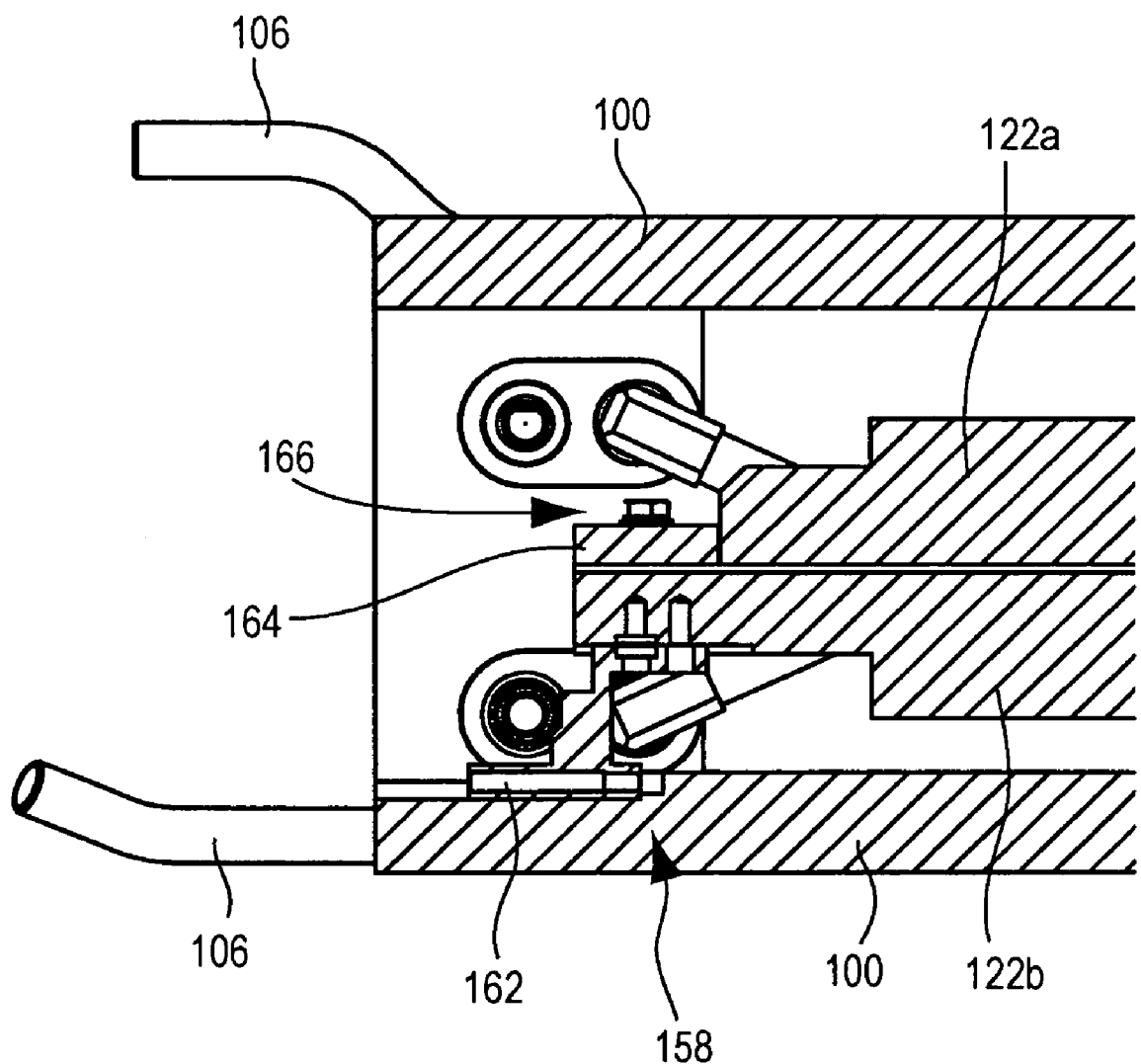
FIG. 7B is a partial cross section drawing illustrating a metal electrode support bracket attached to a laser tube housing within the machined recesses shown in the FIG. 2.
Figure 7C:
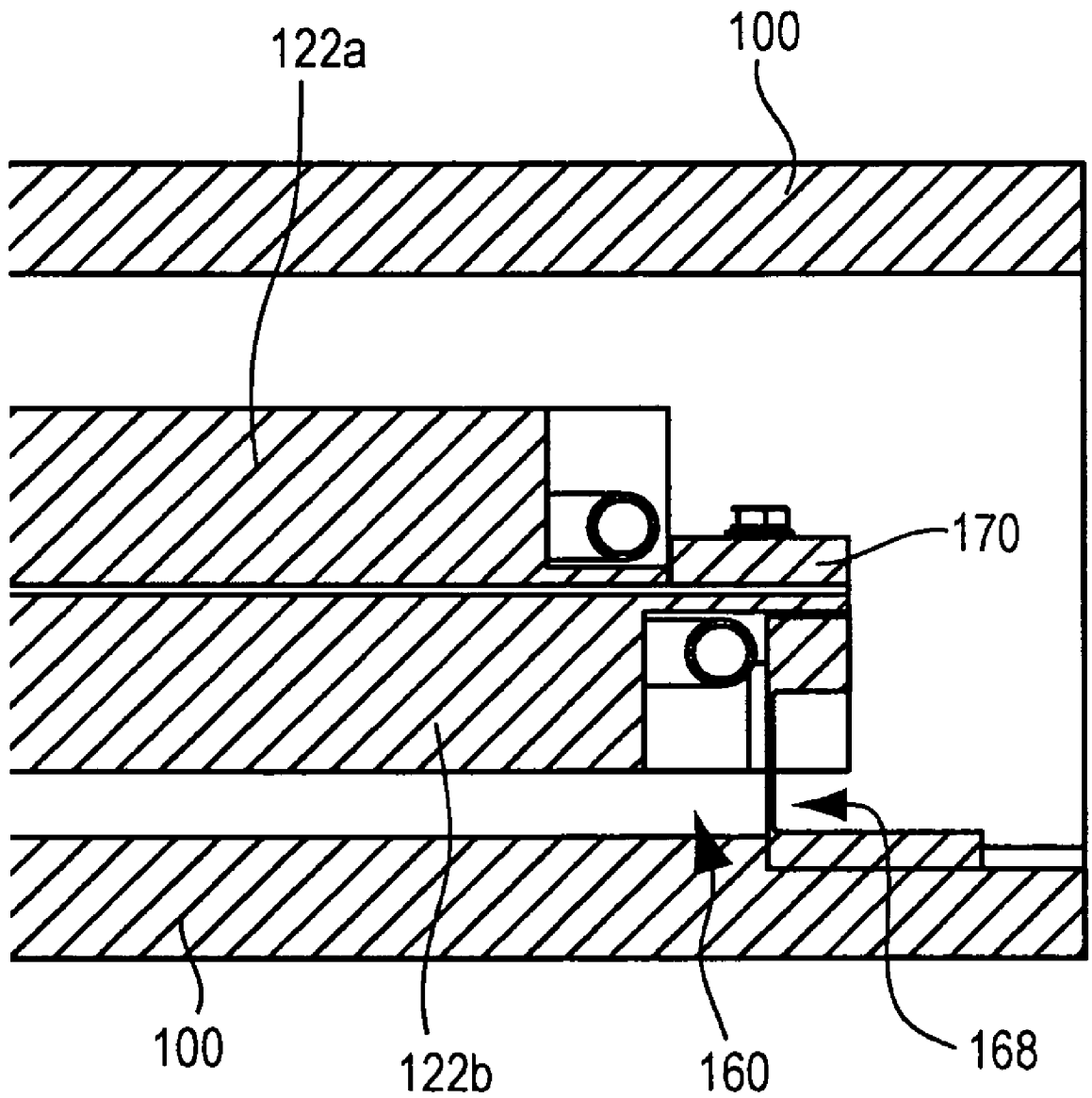
FIG. 7C is a partial cross section drawing illustrating an opposite end of a laser tube housing than is shown in FIG. 7B where a second metal electrode support bracket is attached to the laser tube housing.

Closer views of these electrode supporting brackets 158, 160 are provided in FIGS. 7B for the left end of the FIG. 7A structure and FIG. 7C for the right end of the FIG. 7A structure. FIG. 7B illustrates the "left" metal electrode support bracket 158 attached to the laser tube housing 100 by four screws (not shown) within the machined recess 112 shown in FIG. 2. The top of the bracket 158 is attached to the electrode assembly by threading screws into the portion of the ground electrode 122b that extends past the hot electrode 122a. In the bottom portion of this stiff electrode assembly support bracket 158, a hole 162 is drilled in which an alignment pin (not shown) is inserted. This pin protrudes past the bracket 158 into an alignment hole drilled into the laser tube housing. The pin is used to ease the alignment of the electrode assembly and, thus, the discharge within the narrow gap, with the center line of the laser tube housing 100 which coincides with the laser resonator's alignment. Once the alignment is made and the bracket 158 is firmly attached to the laser tube housing 100, the pin is removed.

A ceramic rectangular wave-guide extension block 164 is placed over a portion of the ground electrode 122b that extends past the top, hot electrode 122a and to which the electrode support bracket 158 is attached. This ceramic block 164 is attached to the ground electrode 122b by a metal bolt 166, as shown in FIG. 7B. The purpose of the ceramic block 164 is to extend the wave-guide from the end of the shorter, hot electrode 122a to the end of the longer, ground electrode 122b. This extended wave-guide reduces the resonator's optical losses. It also prevents the discharge from propagating beyond the end of the hot electrode 122a, which is located further away from the laser's mirrors than the end of the ground electrode 122b. Keeping the discharge away from the mirrors prevents damaging the mirrors which are located on the flange to be attached onto the end of the laser tube housing 100. See U.S. Pat. No. 5,216,689, entitled "Slab Laser with Enhanced Lifetime", issued Jun. 1, 1993 (Ref. 7).

FIG. 7C illustrates the "right" end of the laser tube housing 100 of FIG. 7A where the second metal electrode support bracket 160 is attached to the laser tube housing 100. Note that this bracket 160 has a thinner vertical member 168 to allow it to flex as the electrode assembly expands and contracts due to heating, thereby preventing bending of the electrodes 122a and 122b and the discharge gap. The small gap (i.e., 0.053 inches in the preferred embodiment) separating the two electrodes 122a and 122b makes it critical not to have the height of this gap vary as a function of electrode length. This gap separation functions as the wave-guide portion of the hybrid wave-guide/negative branch unstable optical resonator of the $CO_2$ slab laser and needs to be maintained straight. The bracket 160 is aligned and attached to the housing in the same manner as described above with respect to bracket 158. As in the case of the bracket 158, a ceramic block 170 is utilized to extend the waveguide and to attach the electrode assembly to the bracket 160.

The cooling of the electrodes 122 by providing coolant flow through one of the surfaces of the laser tube housing 100, as discussed above in conjunction with FIG. 6, instead of through one of the end flanges as per the prior art, has the following benefits. It improves the serviceability of the laser's optical cavity because the electrode assembly is mounted directly on the laser tube housing 100 by means of a plate support that is screwed into the machined area on each end of the laser tube housing 100 shown in FIG. 2, and more clearly in FIGS. 7A, 7B, and 7C. In some known laser products, one end of the electrode assembly is held by a similar plate while the other end of the electrode assembly is held in place by the end flanges mounted on the laser tube housing (see Ref. 1). By the teachings of the present invention, the electrode assembly, with its cooling connections in the main manifold 1214 and sub-manifolds 132 and 150, does not have to be touched when either flange needs to be removed to service the laser's optical cavity. The time required to remove the end flange supporting the electrode assembly to inspect or service the optical cavity on some current laser designs and disassemble the coolant connections within the laser tube housing is approximately two hours. It takes more than an additional hour to reassemble the electrode assembly and the end flange by this prior approach. With the teaching of the present invention, the time required to take off either end flange to inspect the optics is reduced to approximately 0.04 to 0.5 the present time. The reassembly time after inspecting the optics of a laser utilizing the disclosed approach is between 0.06 to 0.08 the time needed by the prior art. This time saving is obtained because the coolant manifolds do not have to be disassembled and then re-assembled when the optical resonator is serviced.

It should be understood that the particular embodiments of the invention described above have been provided by way of example and that other modifications may occur to those skilled in the art without departing from the scope and spirit of the invention as expressed in the appended claims and their equivalents.

What is claimed is:

1. A cooling system for a laser tube housing of a $CO_2$ slab laser, wherein the laser tube housing contains an electrode assembly, gas mixture and optical resonator of the slab laser, the cooling system comprising:
   at least one channel formed in the surface of a longitudinal sidewall of the laser tube housing and extending to an intermediate depth of the sidewall; and
   an elongated cooling tube mounted within the channel, the cooling tube being adapted for coolant fluid flow therethrough.

2. The cooling system of claim 1, and wherein the cooling tube is press fitted into the channel.

3. The cooling system of claim 1, and wherein the cooling tube comprises copper.

4. The cooling system of claim 1, and wherein the coolant fluid comprises water.

5. The cooling system of claim 1, and wherein the channel is formed at a longitudinal edge of the laser tube housing.

6. The cooling system of claim 1, and wherein the channel is formed at a junction of at least two sides of the laser tube housing.

7. A cooling system for a rectangular laser tube housing of a $CO_2$ slab laser, wherein the laser tube housing contains an electrode assembly, gas mixture and optical resonator of the slab laser, the cooling system comprising:
   first and second hollowed out portions formed at first and second corners, respectively, of the laser tube housing and extending along the length of the laser tube housing;
   third and fourth hollowed out portion formed at third and fourth corners, respectively, of the laser tube housing and extending along the length of the laser tube housing;
   a first cooling tube having a generally U-shaped portion that is inserted into the first and second hollowed out portions of the laser tube housing; and
   a second cooling tube having a generally U-shaped portion that is inserted into the third and fourth hollowed out portions of the laser tube housing,
   wherein the first and second cooling tubes are adapted for coolant fluid flow therethrough.

8. The cooling system of claim 7, and wherein the first and second cooling tubes comprise copper.

9. The cooling system of claim 7, and wherein the coolant fluid comprises water.

10. A cooling system for a rectangular laser tube housing of a $CO_2$ slab laser having four sidewalls, wherein the laser tube housing contains an electrode assembly, gas mixture and optical resonator of the slab laser, the cooling system comprising:

a channel formed along the length of the housing at each of the four corners, the channel extending to an intermediate depth of the sidewalls; and an elongated cooling tube mounted within each channel, the cooling tube being adapted for coolant fluid flow therethrough.

11. The cooling system of claim 10, and wherein the cooling tube is press fitted into the channel.

12. The cooling system of claim 10, and wherein the cooling tube comprises copper.

13. The cooling system of claim 10, and wherein the coolant fluid comprises water.

* * * * *